(12) United States Patent
DeAtley

(10) Patent No.: US 8,666,366 B2
(45) Date of Patent: Mar. 4, 2014

(54) DEVICE ACTIVATION AND ACCESS

(75) Inventor: Dallas DeAtley, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1131 days.

(21) Appl. No.: 11/767,447

(22) Filed: Jun. 22, 2007

(65) Prior Publication Data

US 2008/0318550 A1 Dec. 25, 2008

(51) Int. Cl.
- *H04M 1/66* (2006.01)
- *H04M 1/68* (2006.01)
- *H04M 3/16* (2006.01)
- *H04M 1/00* (2006.01)

(52) U.S. Cl.
USPC ............................ 455/411; 455/410; 455/558

(58) Field of Classification Search
USPC .............. 455/410–411, 422.1–423, 425, 558; 380/247, 270
See application file for complete search history.

(56) References Cited

U.S. PATENT DOCUMENTS

| | | | |
|---|---|---|---|
| 3,876,942 A | 4/1975 | Koster et al. | |
| 5,386,455 A | 1/1995 | Cooper | |
| 5,835,061 A | 11/1998 | Stewart | |
| 6,134,435 A | 10/2000 | Zicker et al. | |
| 6,137,783 A | 10/2000 | Sailberg | |
| 6,185,427 B1 | 2/2001 | Krasner et al. | |
| 6,199,045 B1 | 3/2001 | Giniger et al. | |
| 6,259,405 B1 | 7/2001 | Stewart et al. | |
| 6,263,214 B1 | 7/2001 | Yazaki et al. | |
| 6,323,846 B1 | 11/2001 | Westerman et al. | |
| 6,456,234 B1 | 9/2002 | Johnson | |
| 6,487,403 B2 | 11/2002 | Carroll | |
| 6,570,557 B1 | 5/2003 | Westerman et al. | |
| 6,611,687 B1 | 8/2003 | Clark et al. | |
| 6,615,213 B1 | 9/2003 | Johnson | |
| 6,677,894 B2 | 1/2004 | Sheynblat et al. | |
| 6,677,932 B1 | 1/2004 | Westerman | |
| 6,731,238 B2 | 5/2004 | Johnson | |
| 6,879,825 B1 | 4/2005 | Daly | |
| 6,888,536 B2 | 5/2005 | Westerman et al. | |
| 7,054,642 B1 | 5/2006 | Matz et al. | |
| 7,187,997 B2 | 3/2007 | Johnson | |
| 7,389,123 B2 * | 6/2008 | Rydgren et al. | ............ 455/550.1 |
| 7,710,290 B2 * | 5/2010 | Johnson | .................... 340/825.49 |

(Continued)

FOREIGN PATENT DOCUMENTS

| | | |
|---|---|---|
| DE | 198 23 074 | 11/1999 |
| EP | 0 367 361 | 5/1990 |

(Continued)

OTHER PUBLICATIONS

Authorized officer Athina Nickitas-Etienne, International Preliminary Report on Patentability in PCT/US2008/75138 mailed Mar. 18, 2010, 10 pages.

(Continued)

*Primary Examiner* — Olumide T Ajibade Akonai
(74) *Attorney, Agent, or Firm* — Womble Carlyle Sandridge & Rice LLP

(57) ABSTRACT

Remote access management for a mobile device includes an activation process where a digitally signed activation record is created by a remote activation service and provided to the mobile device. The activation record is used to determine an activation state for the mobile device. Upon activation, a security process running on the mobile device enforces a security policy regarding remote access to the mobile device.

17 Claims, 6 Drawing Sheets

(56) References Cited

U.S. PATENT DOCUMENTS

| | | |
|---|---|---|
| 2002/0037714 A1 | 3/2002 | Takae et al. |
| 2002/0082048 A1 | 6/2002 | Toyoshima |
| 2002/0085530 A1 | 7/2002 | Toyoshima |
| 2002/0197992 A1 | 12/2002 | Nizri et al. |
| 2003/0083068 A1 | 5/2003 | Wong |
| 2003/0119515 A1 | 6/2003 | Holler et al. |
| 2004/0102183 A1 | 5/2004 | Haub et al. |
| 2004/0121802 A1 | 6/2004 | Kim et al. |
| 2004/0142725 A1 | 7/2004 | Kim |
| 2004/0176133 A1 | 9/2004 | Lipsit |
| 2004/0235458 A1 | 11/2004 | Walden |
| 2004/0242224 A1 | 12/2004 | Janik et al. |
| 2004/0248550 A1* | 12/2004 | Hausner et al. ............... 455/410 |
| 2005/0009502 A1* | 1/2005 | Little et al. .................... 455/411 |
| 2005/0054338 A1* | 3/2005 | Hosokawa ................ 455/422.1 |
| 2005/0079863 A1 | 4/2005 | Macaluso |
| 2005/0120209 A1 | 6/2005 | Kwon et al. |
| 2005/0141438 A1 | 6/2005 | Quetglas |
| 2006/0035631 A1* | 2/2006 | White et al. ................... 455/418 |
| 2006/0046717 A1 | 3/2006 | Bovell |
| 2006/0143098 A1 | 6/2006 | Lazaridis |
| 2006/0154647 A1 | 7/2006 | Choi |
| 2007/0082655 A1* | 4/2007 | Link et al. ..................... 455/410 |
| 2007/0167161 A1 | 7/2007 | Cheng et al. |
| 2007/0271603 A1 | 11/2007 | Lee et al. |
| 2008/0003980 A1* | 1/2008 | Voss et al. ..................... 455/411 |
| 2008/0166993 A1 | 7/2008 | Gautier et al. |
| 2008/0167027 A1 | 7/2008 | Gautier et al. |
| 2008/0167036 A1 | 7/2008 | Bush et al. |
| 2008/0268820 A1 | 10/2008 | Wilson et al. |
| 2008/0318550 A1 | 12/2008 | DeAtley |
| 2009/0061840 A1 | 3/2009 | Fleischman et al. |
| 2009/0061934 A1 | 3/2009 | Hauck et al. |
| 2009/0181662 A1 | 7/2009 | Fleischman et al. |
| 2012/0063580 A1* | 3/2012 | Mamakos ................ 379/201.01 |

FOREIGN PATENT DOCUMENTS

| | | |
|---|---|---|
| EP | 1276339 | 1/2003 |
| EP | 1 361 775 | 11/2003 |
| EP | 1 534 043 | 5/2005 |
| EP | 1 679 925 | 7/2006 |
| EP | 1 748 661 | 1/2007 |
| EP | 2 079 256 | 7/2009 |
| GB | 2 428 544 | 1/2007 |
| WO | 97/42783 | 11/1997 |
| WO | WO 01/15414 | 3/2001 |
| WO | WO 02/058361 | 7/2002 |
| WO | WO 03/041443 | 5/2003 |
| WO | 2004/057485 | 7/2004 |
| WO | 2004/082310 | 9/2004 |
| WO | WO 2004/105421 | 12/2004 |
| WO | 2006/054980 | 5/2006 |
| WO | WO 2006/084183 | 8/2006 |
| WO | WO 2007/079425 | 7/2007 |
| WO | WO 2008/086255 | 7/2008 |
| WO | WO 2009/002649 | 12/2008 |
| WO | WO 2009/032853 | 3/2009 |

OTHER PUBLICATIONS

Authorized officer Beate Giffo-Schmitt, International Preliminary Report on Patentability in PCT/US2009/31016 mailed Jul. 29, 2010, 10 pages.

International Preliminary Report on Patentability, dated Dec. 22, 2009, issued in International Application No. PCT/US2008/064971.

International Search Report and Written Opinion, dated Apr. 24, 2008, issued in International Application No. PCT/US2008/050340.

International Preliminary Report on Patentability, dated Jul. 16, 2009, issued in International Application No. PCT/US2008/050340.

European Search Report, dated Apr. 24, 2008, issued in European Application No. 08250053.

International Search Report corresponding to International Application No. PCT/US2008/064971, dated Jan. 30, 2009, 6 pages.

Invitation to Pay Fees and Partial International Search Report, dated Oct. 22, 2008, issued in International Application No. PCT/US2008/064971.

International Search Report and Written Opinion, dated Jan. 5, 2009, issued in International Application No. PCT/US2008/050343.

International Preliminary Report on Patentability, dated Jul. 7, 2009, issued in International Application No. PCT/US2008/050343.

European Extended Search Report, dated May 5, 2008, issued in European Application No. 08250050.5.

De Atley et al., Service Provider Activation, U.S. Appl. No. 11/849,286, filed Sep. 1, 2007.

Extended European Search Report in EP 11 16 4920 dated Sep. 7, 2011, 10 pages.

CN 200880100699.1. Notification of Fourth Office Action (Jul. 25, 2013).

* cited by examiner

DEVICE ACTIVATION AND ACCESS

RELATED APPLICATION

The subject matter of this patent application is related to co-pending U.S. patent application Ser. No. 11/650,859, for "Mobile Device Activation," filed Jan. 7, 2007, which patent application is incorporated by reference herein in its entirety.

TECHNICAL FIELD

The subject matter of this patent application is generally related to mobile devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, etc. Modern mobile devices can include two or more of these applications. Due to the size limitation of a typical mobile device, such mobile devices may need to rely on a network or other remote services to support these multiple applications. For example, map services may be used to provide maps to a mobile device, which can be used with one or more applications running on the mobile device. Since modern mobile devices often contain sensitive data (e.g., financial data, personal information), there is an increased concern that such data will be stolen or otherwise compromised while accessing remote services.

SUMMARY

Remote access management for a mobile device includes an activation process where a digitally signed activation record is created by a remote application service and provided to the mobile device. The activation record is used to determine an activation state for the mobile device. Upon activation, a security process running on the mobile device can enforce a security policy regarding remote access to the mobile device.

In some implementations, a method includes: detecting a mobile device; generating an activation record specific to the mobile device, the activation record including information for determining an activation state for the mobile device; digitally signing the activation record; and sending the digitally signed activation record to the mobile device.

In some implementations, a method includes: detecting an activation record on a mobile device; responsive to the detection, authenticating the activation record; responsive to a successful authentication, determining an activation state based on the activation record; and activating the mobile device based on the activation state.

In some implementations, a method includes: establishing a serial communications channel with an access device; receiving on the serial communications channel an access request from the access device; responsive to the access request, establishing a secure communications session with the access device using the serial communications channel; and receiving on the serial communications channel multiplexed information from the access device.

Other implementations are disclosed, including implementations directed to methods, systems and computer-readable mediums.

DETAILED DESCRIPTION

Figure 1:
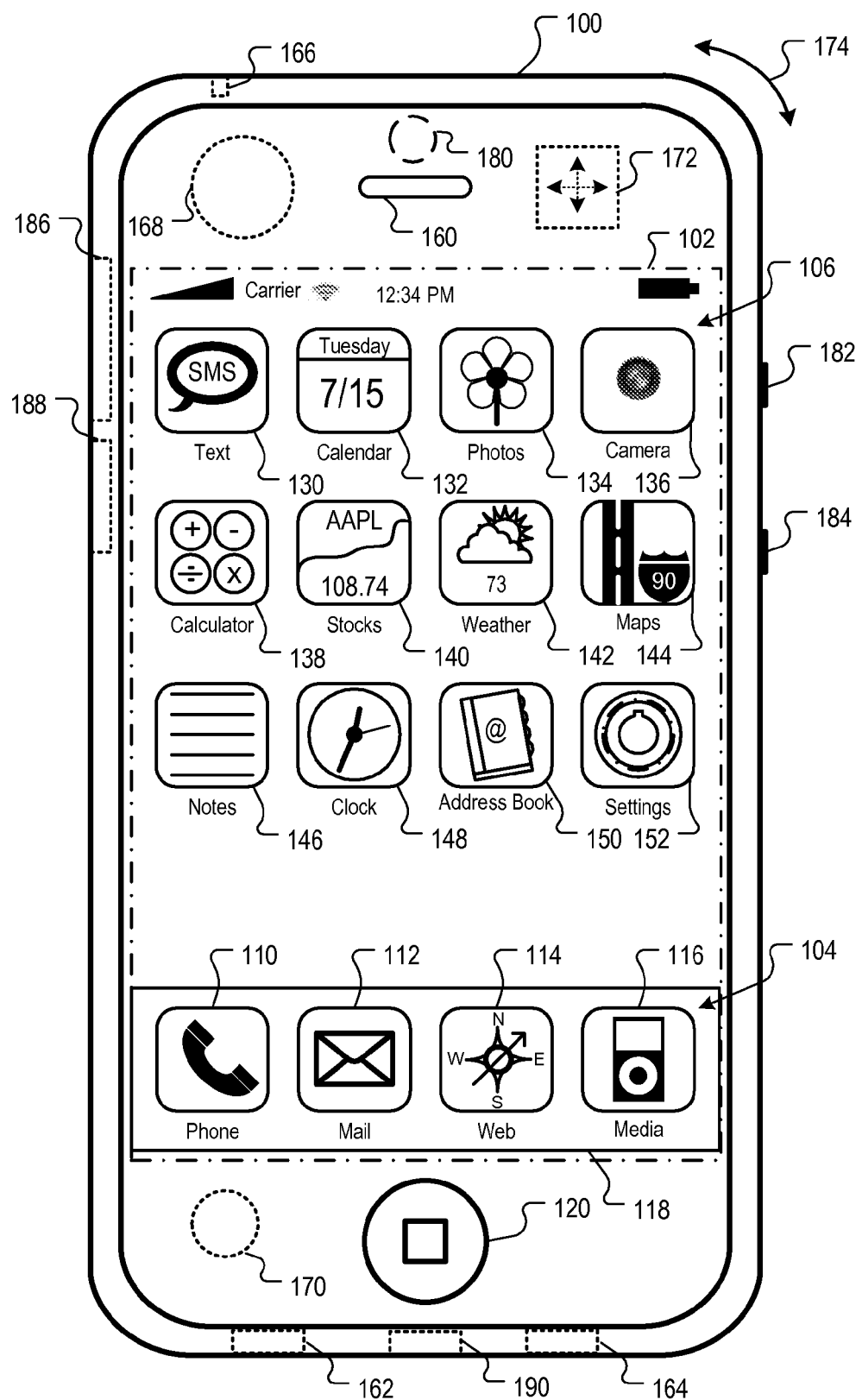
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other electronic device or a combination of any two or more devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846; 6,570,557; 6,677,932; and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116, can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as a 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used, as described in U.S. Provisional Patent Application No. 60/945,904, filed Jun. 22, 2007, for "Multiplexed Data Stream Protocol," which provisional patent application is incorporated by reference herein in its entirety.

Network Operating Environment

Figure 2:
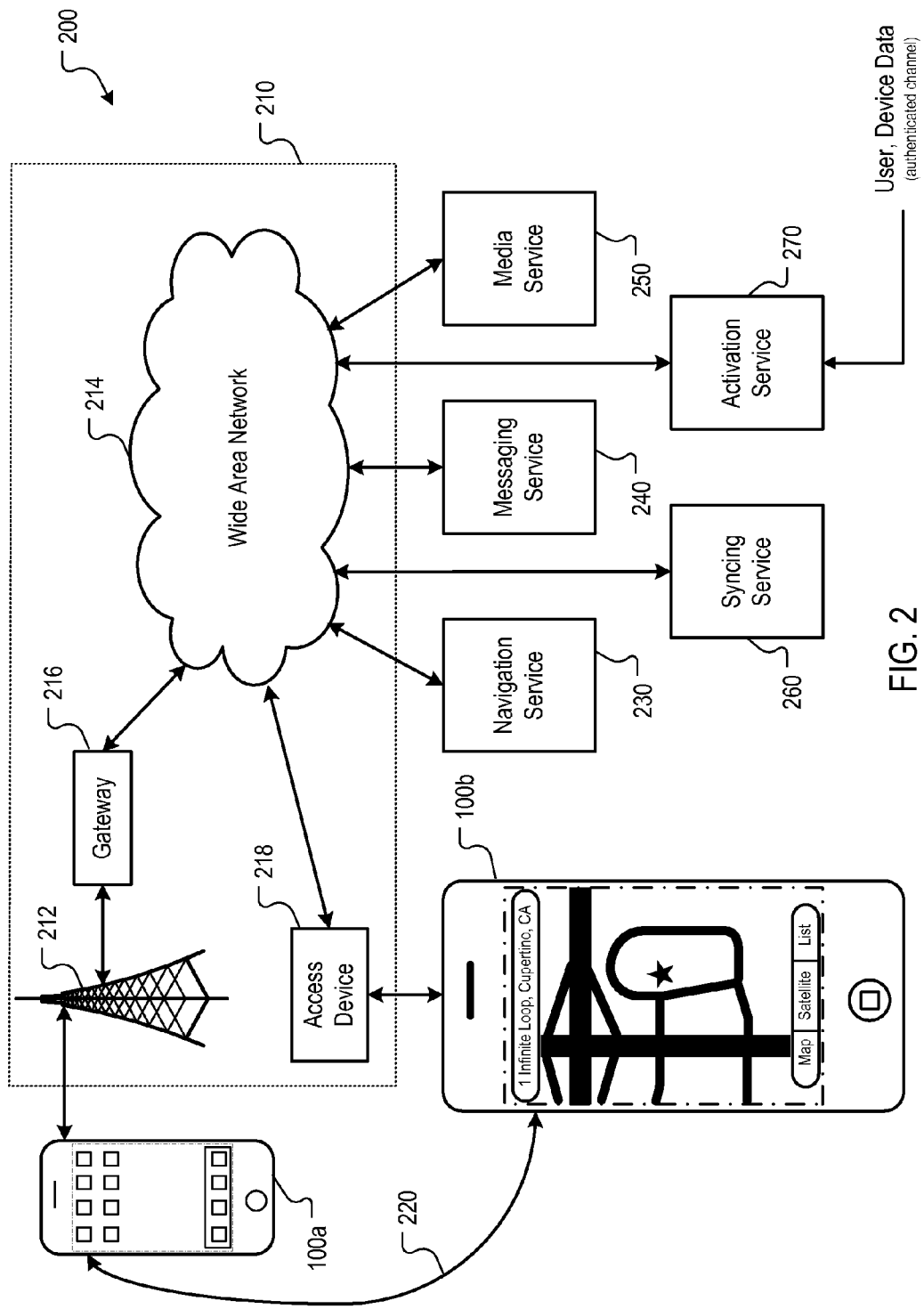
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access device 218 and the wide area network 214. In some implementations, the mobile device 100 can be physically connected to the access device 218 using one or more cables and the access device 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, 260, 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. A syncing service 260 can, for example, perform syncing services (e.g., sync files). An activation service 270 can, for example, perform an activation process 500 for activating the mobile device 100, as described in reference to FIG. 5. Other services can also be provided, including a software update service that automatically determines whether software updates exist for software on the mobile device 100, then downloads the software updates to the mobile device 100 where it can be manually or automatically unpacked and/or installed.

The mobile device 100 can also access other data and content over the one or more wired and/or wireless networks 210. For example, content publishers, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Example Mobile Device Architecture

Figure 3:
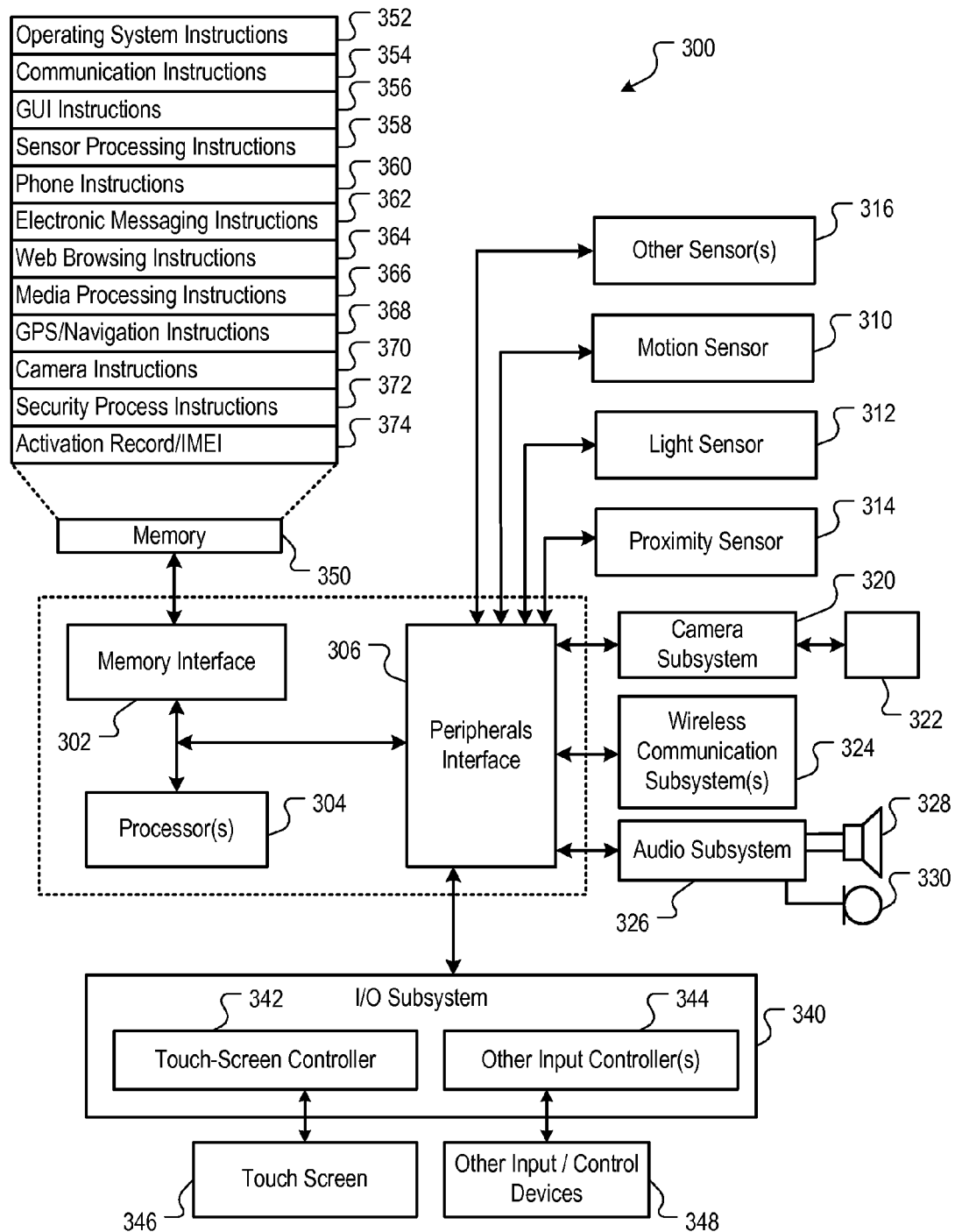
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enable functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keypad or keyboard.

In some embodiments, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel), as described in reference to FIGS. 4A and 4B.

The memory 350 may also store communication instructions to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other security instructions 372 to facilitate security processes and functions, as described in reference to FIGS. 4-6. As described below, an activation record and IMEI 374 or similar hardware identifier can also be stored in memory 350.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Software Stack and Security Process

Figure 4A:
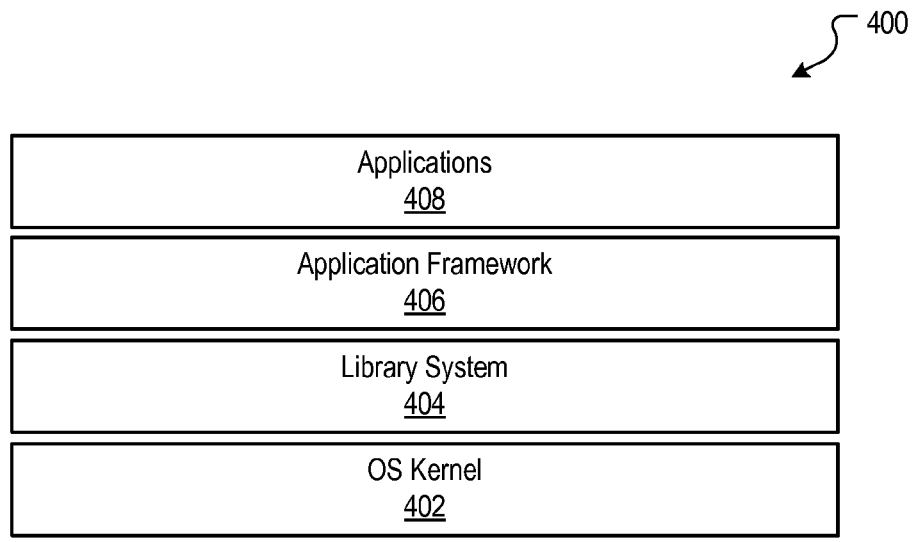
FIG. 4A illustrates an example implementation of a software stack for the mobile device of FIG. 1

FIG. 4A illustrates an example implementation of a software stack 400 for the mobile device of FIG. 1. In some implementations, the software stack 400 includes an operating system (OS) kernel 402 (e.g., a UNIX kernel), a library system 404, an application framework 406 and an application layer 408.

The OS kernel 402 manages the resources of the mobile device 100 and allows other programs to run and use these resources. Some examples of resources include a processor, memory and I/O. For example, the kernel 402 can determine which running processes should be allocated to a processor, processors or processor cores, allocates memory to the processes and allocates requests from applications and remote services to perform I/O operations. In some implementations, the kernel 402 provides methods for synchronization and inter-process communications with other devices.

In some implementations, the kernel 402 can be stored in non-volatile memory of the mobile device 100. When the mobile device 100 is turned on, a boot loader starts executing the kernel 102 in supervisor mode. The kernel then initializes itself and starts one or more processes for the mobile device 100, including a security process 410 for remote access management, as described in reference to FIG. 4B.

The library system 404 provides various services applications running in the application layer 408. Such services can include audio services, video services, database services, image processing services, graphics services, etc.

The application framework 406 provides an object-oriented application environment including classes and Application Programming Interfaces (APIs) that can be used by developers to build applications using well-known programming languages (e.g., Objective-C, Java).

The applications layer 408 is where various applications exist in the software stack 400. Developers can use the APIs and environment provided by the application framework 406 to build applications, such as the applications represented by the display objects 104, 106, shown in FIG. 1 (e.g., email, media player, Web browser, phone).

Secure Communication Channel

Figure 4B:
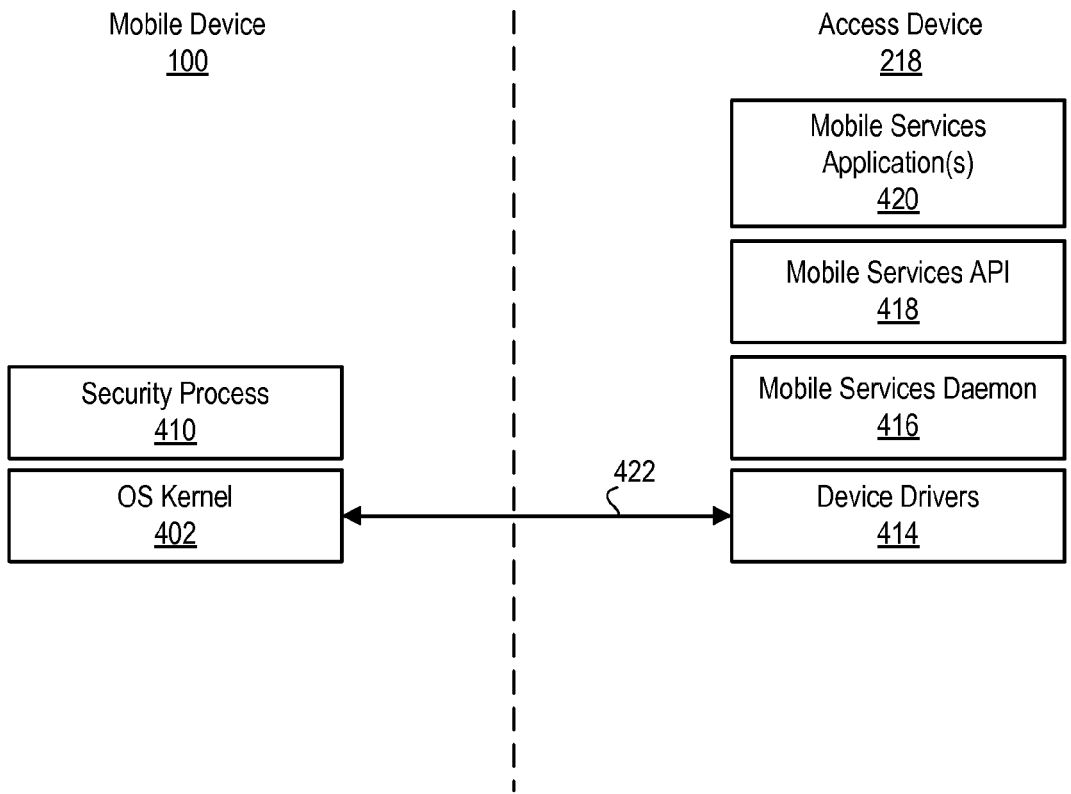
FIG. 4B illustrates an example implementation of a security process 410 for remote access management over a secure communications channel.

FIG. 4B illustrates an example implementation of a security process 410 for remote access management over a secure communications channel 422. In the example shown, the mobile device 100 is running the security process 410, which communicates with the OS kernel 402. Any remote access requests made to the kernel 402 are intercepted by the security process 410, which is responsible for setting up secure communication sessions between the mobile device 100 and a mobile services access device 218. In some implementations, the process 410 uses a cryptographic protocol, such as Secure Sockets Layer (SSL) or Transport Layer Security (TLS) to provide secure communications between the mobile device 100 and the access device 218. The access device 218 can be any device with network connectivity, including but not limited to: a personal computer, a hub, an Ethernet card, another mobile device, a wireless base station, etc. The secure communications channel can be a Universal Serial Bus (USB), Ethernet, a wireless link (e.g., Wi-Fi, WiMax, 3G), an optical link, infrared link, FireWire™, or any other known communications channel or media.

In the example shown, the access device 218 includes device drivers 414, a mobile services daemon 416, a mobile services API 418 and one or more mobile service applications 420. The device drivers 414 are responsible for implementing the transport layer protocol, such as TCP/IP over USB. The mobile services daemon 416 listens (e.g., continuously) to the communications channel 422 for activity and manages the transmission of commands and data over the communication channel 422. The mobile services API 418 provides a set of functions, procedures, variables and data structures for supporting requests for services made by the mobile services application 420. The mobile services application 420 can be a client program running on the access device 218, which provides one or more user interfaces for allowing a user to interact with a remote service (e.g., activation service 270) over a network (e.g., the Internet, wireless network, peer-to-peer network, optical network, Ethernet, intranet). The application 420 can allow a user to set preferences, download or update files of content or software, search databases, store user data, select services, browse content, perform financial transactions, or engage in any other online service or function. An example of a mobile services application 420 is the iTunes™ client, which is publicly available from Apple Inc. (Cupertino, Calif.). An example of a mobile device 100 that uses the iTunes™ client is the iPod™ product developed by Apple Inc.

In an example operational mode, a user connects the mobile device 100 to the mobile access device using, for example, a USB cable. In other implementations, the mobile device 100 and access device 218 include wireless transceivers for establishing a wireless link (e.g., Wi-Fi). The drivers 414 and kernel 408 detect the connection and alert the security process 410 and mobile services daemon 416 of the connections status. Once the connection is established certain non-sensitive information can be passed from the mobile device 100 to the access device 218 (e.g., name, disk size, activation state) to assist in establishing a secure communication session.

In some implementations, the security process 410 establishes a secure communication session (e.g., encrypted SSL session) with the access device 218 by implementing a secure network protocol. For example, if using SSL protocol, the mobile device 100 and access device 218 will negotiate a cipher suite to be used during data transfer, establish and share a session key, and authenticate the access device 218 to the mobile device 100. In some implementations, if the mobile device 100 is password protected, the security process 410 will not establish a session, and optionally alert the user of the reason for failure.

Once a secure session is successfully established, the mobile device 100 and the access device 218 can exchange sensitive information (e.g., passwords, personal information), and remote access to the mobile device 100 can be granted to one or more services (e.g., navigation service 230, messaging service 240, media service 250, syncing service 260, activation service 270). In some implementations, the mobile services daemon 416 multiplexes commands and data for transmission over the communication channel 422. This multiplexing allows several remote services to have access to the mobile device 100 in a single session without the need to start a new session (or handshaking) for each service requesting access to the mobile device 100.

Example Activation Process

Figure 5:
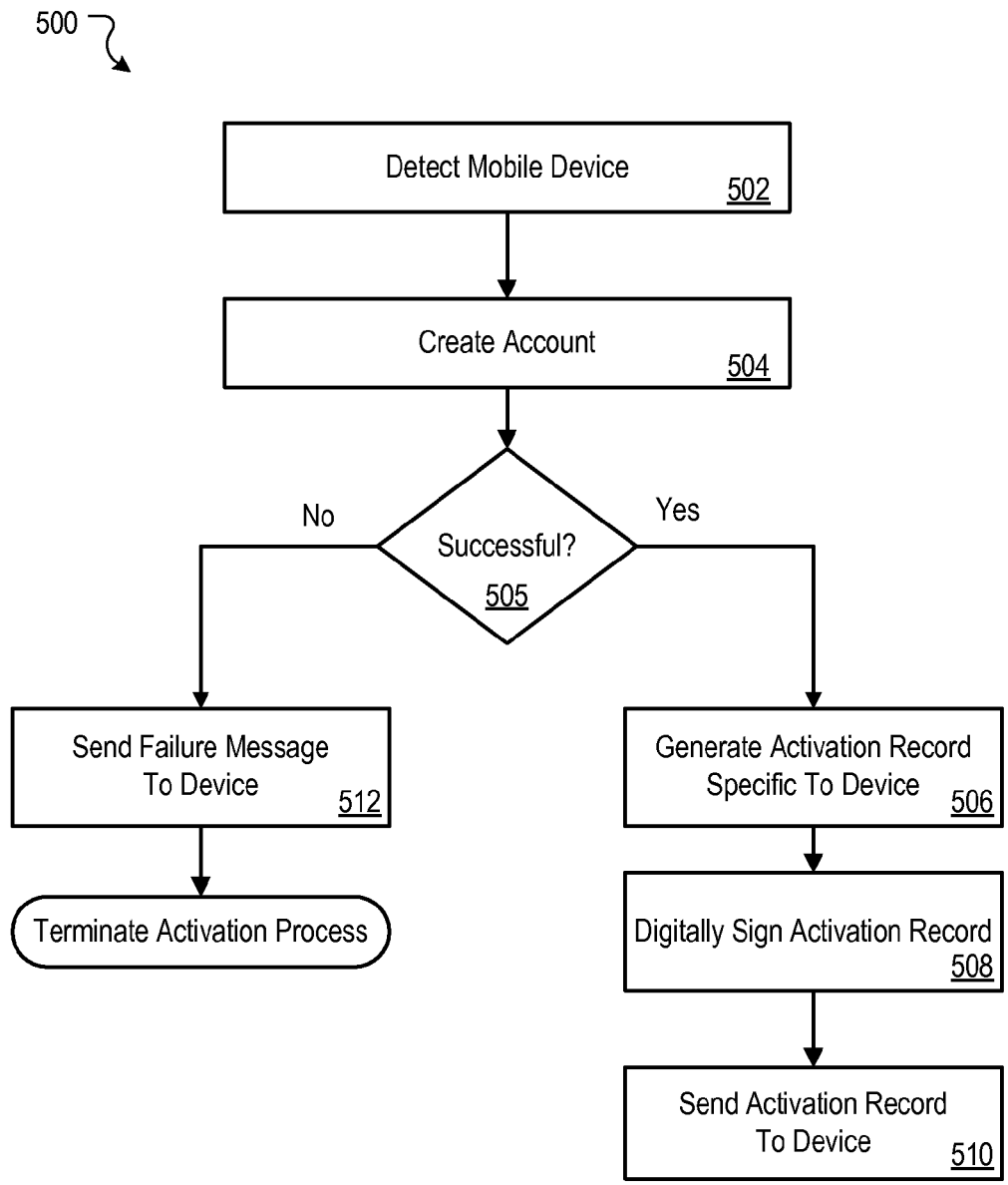
FIG. 5 is a flow diagram of an example activation process for an access device.

FIG. 5 is a flow diagram of an example activation process 500 for an access device. The process 500 begins when the access device detects a mobile device (502). The detection can result from a physical connection made between the mobile device 100 and the access device 218 (e.g., connecting USB ports) or by detecting an access request through a wireless link (e.g., Wi-Fi). In some implementations, after a secure session is established (e.g., SSL session) between the mobile device and the access device (e.g., a personal computer), a client application is automatically invoked which directs the client to an activation service (e.g., activation service 270). The activation service requests information from the user (e.g., through one or more web pages), which can be used to create an account for the user (504). An example of an activation service for creating an account is described in U.S. patent application Ser. No. 11/821,591, published as 2008/0166993A1 on Jul. 10, 2008 for "Method and System for Mobile Device Activation," filed Jun. 22, 2007, which patent application is incorporated by reference herein in its entirety. The account can be a prerequisite for receiving one or more remote services provided by one or more remote service providers (e.g., carrier services, content portals, websites). For example, if the mobile device includes a telephony application, an account may be established with a carrier.

When the user purchases the mobile device, the mobile device will typically include a Subscriber Identity Module (SIM), Universal Integrated Circuit Card (UICC), Removable User Identity Module (RUIM) or similar removable device that allows users to change mobile devices by simply removing the module or card from one mobile device and inserting it into another mobile device. SIM cards typically store network specific information used to authenticate and identify subscribers on a network. This information can include an International Circuit Card ID (ICCID), International Mobile Subscriber Identity (IMSI), Authentication Key (Ki), Local Area Identity (LAI). The SIM card also stores other carrier specific data such as an Short Message Service Centre (SMSC) number, Service Provider Name (SPN), Service Dialing Numbers (SDN) and Value Added Service (VAS) applications. ICCIDs are stored in the SIM cards and are also engraved or printed on the SIM card body during a process called personalization. SIM cards are identified on their individual operator networks by holding a unique IMSI. Mobile operators connect mobile phone calls and communicate with their market SIM cards using their IMSI.

In addition to the identifiers described above, the mobile device itself will often have a unique serial number or ID, such as a International Mobile Equipment Identity (IMEI). The IMEI is a 15 digit number that typically can be found at the back of the mobile device battery or by pressing *#06#*.

In some implementations, the activation service maintains a relational database or registry (e.g., MySQL™) of user information, ICCIDs, IMEI and any other information needed to authenticate a user and to provide activation services. Using this database or registry, the activation service knows, for example, that a particular mobile device with a particular IMEI, with a particular SIM card was purchased by a particular user on a particular date, and that a particular carrier is providing one or more services to the user, and the activation date of those services. This information can be received through an authenticated communication channel that is different than the communication channel used for activating the mobile device or receiving remote services.

In some implementations, the foregoing information known by the activation service can be compared with information requested from the user through the activation process 500, for purposes of authenticating the user to ensure that the user requesting the activation service 500 is the true owner of the phone and/or an authorized subscriber of phone services.

If creating an account is not successful (505), then a failure message can be sent to the mobile device for display to the user (512) and/or other action taken, and the activation process 500 can be terminated and/or other action taken (e.g., providing the user with activation instructions or automatically restarting the process 500).

If the creation of an account is successful (505), then the activation service can generate an activation record specific to the mobile device (506). In some implementations, the activation record can include an ICCID and IMEI. In some implementations, the activation record is digitally signed (508) using known digital signature technology (e.g., SHA-1, RSA, DSA, ECDSA, Rabin signature). Once signed, the activation record can be transmitted to the mobile device (510), where the activation record can be used by the mobile device to complete an activation process and determine an activation state, as described in reference to FIG. 6.

Figure 6:
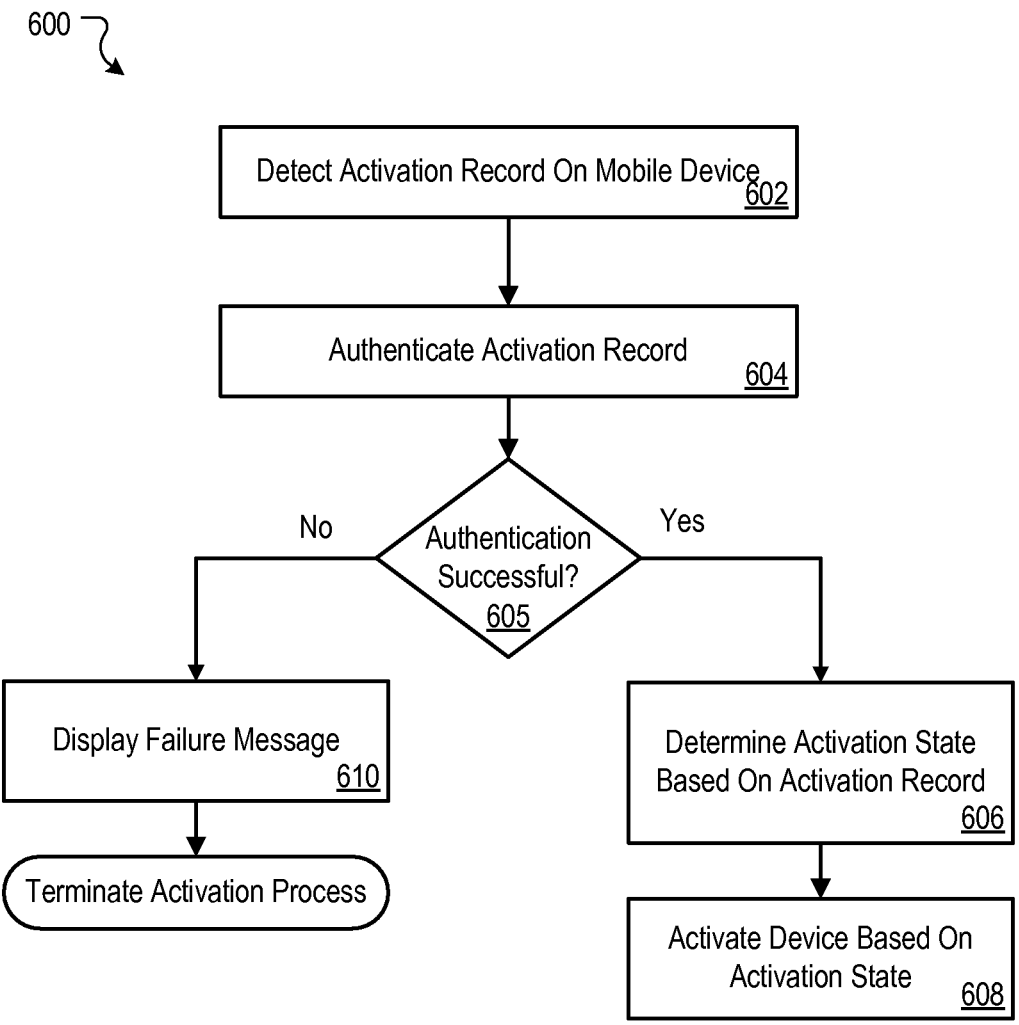
FIG. 6 is a flow diagram of an example activation process for the mobile device of FIG. 1.

FIG. 6 is a flow diagram of an example activation process 600 for the mobile device of FIG. 1. The process 600 begins when the mobile device detects an activation record (602). For example, the security process 410 looks for the presence of the activation record on the mobile device 100. If the activation record is present, the security process authenticates the activation record (604) by, for example, verifying that the activation record was properly signed by the activation service (e.g., signed with a private key of the activation service 270). Authenticating can also include verifying that the ICCID and IMEI in the activation record matches the ICCID and IMEI of the mobile device.

If the authentication is not successful (606), a failure message can be displayed on the mobile device and/or other action taken (610), and the activation process 600 can be terminated and/or other action taken. For example, if the mobile device includes a telephony application and a media player application, a failed authentication may place the mobile device in active state, where only the media player application can be operated and the telephony application is locked down.

If the authentication is successful (606), an activation state is determined by comparing the information in the activation record (e.g., ICCID, IMEI) with information contained in the mobile device (606). For example, the ICCID and IMEI in the activation record can be compared with the ICCID of the SIM card installed on the mobile device and the IMEI stored in memory on the mobile device. Based on results of the comparison, one of a number of possible activation states for the mobile device can be determined, and the device can be placed in that activation state (608).

In some implementations, a mobile device can have the following exemplary activation states: Unactivated, Activated, MissingSIM, MismatchedIMEI, and MismatchedSIM. Other activations states are possible.

In an Unactivated state the mobile device has never been activated. In this case, the mobile device 100 can be entirely disabled, except for making emergency calls in some implementations if the mobile device 100 includes a telephony application. In some implementations, the mobile device 100 can be disabled by locking down the graphical user interface, so that the user cannot invoke any applications or remote services. In an Activated state, the mobile device is fully activated, allowing the user total access to all the features of the mobile device 100, including access to remote services.

In a MissingSIM state, the mobile device is activated, but the SIM card is not present in the mobile device 100. This could occur, for example, in a factory setting for testing mobile devices in a quality control process. In some implementations of this case, the mobile device 100 may be activated for predetermined time interval without a SIM card, then deactivated when the testing is completed or the time interval expires. In some implementations, the activation service 270 can be located in the factory.

In a MismatchedIMEI state, the mobile device is activated, but the radio has been changed. In some implementations of this case, the security process 410 running on the mobile device 100 can lockdown the telephony application but allow other applications to work (e.g., allow the device to be used as a media player). Other desired actions can also be performed.

In the MismatchedSIM state, the mobile device is activated but the user has placed a different SIM in the mobile device 100. In some implementations of this case, the radio or modem in the mobile device 100 can be disabled, or other suitable action taken.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

After the mobile device is activated, in some implementations the security process 410 monitors (e.g., continuously) remote access requests and sets-up and tears-down secure sessions as needed. Thus, in such an implementation all remote access requests are managed by a security process 410, which can include one or more processes. If a user alters the mobile device (e.g., changing a SIM card), the security process 410 will detect the change and initiate an action, such as starting a new activation process 500, 600.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method performed by a mobile device, the method comprising:
   receiving an activation record from an activation service, the activation record including data that identifies the mobile device and identifies a carrier network associated with the mobile device;
   authenticating the activation record; and
   responsive to successfully authenticating the activation record, comparing the data in the activation record to data associated with the mobile device prior to receiving the activation record, wherein the comparing comprises:
      comparing an Integrated Circuit Card Identifier (ICCID) in the activation record to an ICCID of a Subscriber Identity Module (SIM) card installed on the mobile device, and determining, based on the comparing, whether the mobile device is in a mismatched SIM state in which a user has placed a different SIM in the mobile device,
      disabling a radio or modem in the mobile device in response to determining that the mobile device is in the mismatched SIM state,
      comparing an International Mobile Equipment Identity (IMEI) in the activation record to an IMEI stored in a memory of the mobile device, and determining, based on the comparison, whether the mobile device is in a mismatched IMEI state in which a radio has changed, and
      locking down a telephony application, while allowing other applications to operate, in response to determining that the mobile device is in the mismatched IMEI state.

2. The method of claim 1, further comprising allowing access only to a media application loaded on the mobile device.

3. The method of claim 1, further comprising allowing access to all of a plurality of applications loaded on the mobile device except a telephony application.

4. The method of claim 1, where the mobile device includes a multi-touch-sensitive display.

5. The method of claim 1, further comprising:
   managing remote access through a secure communications channel.

6. The method of claim 1, where the communications channel is a secure socket layer.

7. A mobile device, comprising:
   a processor;
   a computer-readable medium coupled to the processor and including instructions, which, when executed by the processor, cause the processor to perform operations comprising:
      receiving an activation record from an activation service, the activation record including data that identifies the mobile device and identifies a carrier network associated with the mobile device;
      authenticating the activation record; and
      responsive to successfully authenticating the activation record, comparing the data in the activation record to data associated with the mobile device prior to receiving the activation record, wherein the comparing comprises:
         comparing an Integrated Circuit Card Identifier (ICCID) in the activation record to an ICCID of a Subscriber Identity Module (SIM) card installed on the mobile device, and determining, based on the comparing, whether the mobile device is in a mismatched SIM state in which a user has placed a different SIM in the mobile device,
         disabling a radio or modem in the mobile device in response to determining that the mobile device is in the mismatched SIM state,
         comparing an International Mobile Equipment Identity (IMEI) in the activation record to an IMEI stored in a memory of the mobile device, and determining, based on the comparison, whether the mobile device is in a mismatched IMEI state in which a radio has changed, and
         locking down a telephony application, while allowing other applications to operate, in response to determining that the mobile device is in the mismatched IMEI state.

8. The mobile device of claim 7, wherein the processor performs an operation comprising preventing access only to a telephony application when the activation state is not activated as a result of a device identification mismatch.

9. The mobile device of claim 7, wherein the processor performs an operation comprising including access to all applications loaded on the mobile device except a telephony application.

10. The mobile device of claim 7, where the mobile device includes a multi-touch-sensitive display.

11. The mobile device of claim 7, where the processor performs an operation comprising:
    managing remote access through a secure communications channel.

12. The mobile device of claim 7, where the communications channel is a secure socket layer.

13. A non-transitory computer-readable medium of a mobile device having instructions stored thereon, which, when executed by a processor of a mobile device, cause the processor to perform operations comprising:
    receiving an activation record from an activation service, the activation record including data that identifies the mobile device and identifies a carrier network associated with the mobile device;
    authenticating the activation record; and
    responsive to successfully authenticating the activation record, comparing the data in the activation record to data associated with the mobile device prior to receiving the activation record, wherein the comparing comprises:

comparing an Integrated Circuit Card Identifier (ICCID) in the activation record to an ICCID of a Subscriber Identity Module (SIM) card installed on the mobile device, and determining, based on the comparing, whether the mobile device is in a mismatched SIM state in which a user has placed a different SIM in the mobile device, disabling a radio or modem in the mobile device in response to determining that the mobile device is in the mismatched SIM state, comparing an International Mobile Equipment Identity (IMEI) in the activation record to an IMEI stored in a memory of the mobile device, and determining, based on the comparison, whether the mobile device is in a mismatched IMEI state in which a radio has changed, and locking down a telephony application, while allowing other applications to operate, in response to determining that the mobile device is in the mismatched IMEI state.

14. The non-transitory computer readable medium of claim 13, the operations further comprising preventing access only to a telephony application when the activation state is not activated as a result of an unrecognized SIM card being placed in the mobile device.

15. The non-transitory computer readable medium of claim 13, the operations further comprising allowing temporary access to all applications of the mobile device for a predetermined time interval when the activation state is not activated as a result of a missing SIM card.

16. The non-transitory computer readable medium of claim 13, the operations further comprising preventing access only to a telephony application when the activation state is not activated as a result of a device identification mismatch.

17. The non-transitory computer readable medium of claim 16, the operations further comprising:

prior to receiving an activation record from the activation service, providing no access to the mobile device.

* * * * *

UNITED STATES PATENT AND TRADEMARK OFFICE
CERTIFICATE OF CORRECTION

PATENT NO. : 8,666,366 B2  
APPLICATION NO. : 11/767447  
DATED : March 4, 2014  
INVENTOR(S) : Dallas DeAtley Page 1 of 1

It is certified that error appears in the above-identified patent and that said Letters Patent is hereby corrected as shown below:

In the Claims:

Column 14, claim 6, line 1, currently reads: "The method of claim 1, where the communications channel"
Column 14, claim 6, line 1, should read: "The method of claim 5, where the communications channel"

Column 14, claim 12, line 53, currently reads: "The mobile device of claim 7, where the communications"
Column 14, claim 12, line 53, should read: "The mobile device of claim 11, where the communications"

Signed and Sealed this
Seventeenth Day of June, 2014

Michelle K. Lee
*Deputy Director of the United States Patent and Trademark Office*